United States Patent [19]

Hsu

[11] Patent Number: 5,274,715
[45] Date of Patent: Dec. 28, 1993

[54] CHARACTERIZING IMAGE TEXTURE

[76] Inventor: Shin-yi Hsu, 2312 Hemlock La., Vestal, N.Y. 13850

[21] Appl. No.: 729,139

[22] Filed: Jul. 12, 1991

Related U.S. Application Data

[63] Continuation-in-part of Ser. No. 410,218, Sep. 21, 1989, abandoned.

[51] Int. Cl.$^5$ .............................................. G06K 9/46
[52] U.S. Cl. .......................................... 382/28; 382/1
[58] Field of Search ..................... 382/1, 19, 22, 28, 6

[56] References Cited

U.S. PATENT DOCUMENTS

| | | | |
|---|---|---|---|
| 4,229,797 | 10/1980 | Ledley | 358/106 |
| 4,617,682 | 10/1986 | Mori et al. | 382/28 |
| 4,839,807 | 6/1989 | Doi et al. | 382/6 |
| 4,897,881 | 1/1990 | Ledinh et al. | 382/28 |
| 5,040,225 | 8/1991 | Gouge | 382/28 |

Primary Examiner—Leo H. Boudreau
Assistant Examiner—David Fox
Attorney, Agent, or Firm—Salzman & Levy

[57] ABSTRACT

The present invention features a method of characterizing texture of an image. The image is interrogated at least twice in accordance with at least two respective spatial threshold rules. A value for each of the interrogations is obtained. A mesotexture index is calculated by dividing the product of the values by the difference thereof. A plurality of resulting mesotexture indices can be used to generate a characteristic curve that uniquely identifies the image. Since the process is not iterative, a plurality of interrogating steps can be performed in parallel.

18 Claims, 3 Drawing Sheets

CHARACTERIZING IMAGE TEXTURE

RELATED APPLICATION

This patent application is a continuation-in-part of U.S. patent application Ser. No. 07/410,218, filed Sep. 21, 1989, now abandoned, for "Characterizing Image Texture" by the present applicant, now abandoned.

BACKGROUND OF THE INVENTION

The present invention relates to a method of analyzing an image and, more particularly, to a method of characterizing the texture of segments of the image.

In the field of image processing, it is desirable to increase resolution of images (e.g., photographs, thermographs, real time video signals and the like) to facilitate the identification of features therein. Improved image resolution and enhancing images are continuing goals in such areas as robotics, industrial automation and inspection, aerial photography, military surveillance, personal security systems, meteorology, astronomy, biology, medicine, geology and other fields of science and technology.

Three levels of machine vision are generally recognized: low, middle and high. Low level vision generally indicates that processing occurs at the pixel level, such as can be accomplished by low pass filtering, edge detection and the like. A relatively simple mean and standard deviation technique represents one microtexture measure; a moving window pixel pair contrast is another measure; and a first neighbor contrast is another measure known in the art.

Middle level vision usually includes processing methods that extract edges and certain regions. Finally, interpreting total or global scene content in a gestalt approach is generally regarded as high level vision.

When an image is digitized and stored or analyzed as a plurality of picture elements (pixels), the quality of one or more pixels can be modified in accordance with certain arbitrary transformation rules. In this context, pixel quality can represent one or more characteristics including, but not limited to intensity, darkness, color, and tone. The foregoing characteristics, and all combinations thereof, define the microtexture (i.e., the surface roughness) of the image patterns.

An image transformation rule may require a dark pixel to be changed to a light pixel, for example, if it is surrounded by light pixels. Another image transformation rule may require a dark pixel to be changed to a light pixel if any one of its contiguous pixels is light. The foregoing examples are extreme and necessarily simplistic ones, for purposes of illustration. Many other transformation rules can be devised of significantly more sophistication and complexity dependent on internal and external conditions, such as boundary conditions.

Often, the image that results when a given transformation rule is applied is not the final, most enhanced image obtainable. This intermediate or meta-image must then be subjected to the transformation rule again or to another transformation rule to obtain a more enhanced image. The more enhanced image, in turn, may not be the final version and may be operated on by the transformation rule yet again. The cumulative effect of the iterations is a substantially enhanced, altered image, quantifiably different than the raw image on which it was based.

It is not uncommon for a raw image to undergo a number of iterative transformations until (a) a predetermined number of transformation stages has been performed or (b) a desired final image result has been achieved. The time required to process an image using the aforementioned iterative approach is therefore a function of the number of transformation stages required.

One of the most difficult concepts to quantify in image processing is texture. For example, a river in a given aerial photograph has a texture distinct from the texture of a forest in the same photograph. And the texture of a building in the photograph is distinct from either of the foregoing textures. While distinguishing these global features with the use of boundaries and bounded regions based on texture is a relatively simple task for humans, quantifying such macrotexture and characterizing features of a scene by such a quantifying technique has proven to be extremely difficult for machines.

Prior art solutions to image segment identification and characterization problems often require iteration, as mentioned above, whereby a solution is obtained over a period of time while an image is sequentially processed from one stage to another. Eventually, if the processing rule or rules are chosen correctly, the successive images converge into a final, greatly enhanced image. One such method for segmenting texture of an image by means of an iterative process is disclosed in "MITES: A Model-Driven, Iterative Texture Segmentation Algorithm" by L. S. Davis et al., Computer Graphics and Image Processing, Vol. 19, No. 2, pp. 95-110 (Jun. 1982). In addition to shortcomings associated with iterative techniques in general, the MITES system fails to quantify texture.

Unfortunately, the MITES and other techniques are subject to a variety of inconveniences and disadvantages, not the least of which is a great amount of time necessary to complete processing. The nature of serial, iterative activity mandates that work on each succeeding image must await completion of the previous analysis stage. Moreover, errors tend to increase and/or become magnified in iterative processes. Thus, the greater the number of stages required to achieve highly enhanced images, the greater the probability of significant errors perturbing the end result.

A pattern identification technique is illustrated in U.S. Pat. No. 4,617,682, issued to Mori et al on Oct. 14, 1986. In this iterative process, a reference area is measured against any observed area. Both areas are correlated and compared. The result of the comparison, known as the texture component ratio, is merely a measure of the difference between the reference and the examined areas. No features are extracted or analyzed from the reference area. The aforementioned system is therefore nothing more than a correlation between two images at the pixel level. Moreover, because all the values are interdependent, they cannot be parallel processed. In contrast, if the system of the present invention is used for comparing images, such comparison is made at the feature (not the pixel) level. The aforementioned process, therefore, is not only time consuming, but does not provide the feature analysis for either the observed (examined) area or for the reference area itself, as can be achieved with the present invention, explained in greater detail hereinafter.

Another common prior art technique for characterizing or classifying images or portions thereof is a filtering process known as super slicing. By this technique, an image is analyzed pixel by pixel by comparing a predetermined absolute threshold value to each pixel. If the darkness or intensity value of a given pixel is, say, greater than the predetermined value, the pixel is considered black and is treated as such in the course of further arithmetic processing. A characterization of the image is then derived as a function of the number of pixels darker than the threshold value.

This prior art approach to classifying images lacks predictability under all conditions. In the case of images having a preponderance of pixels in a dark range, for example, an arbitrary threshold comparison value could lead to a 100% black characterization. Conversely, an image having mostly light pixels could lead to a 100% white characterization. Neither of these conclusions would be especially useful when two or more similar (but not identical) dark or light images were to be analyzed and classified.

It would be advantageous to provide a system for characterizing image texture by a method that was not necessarily iterative.

It would also be advantageous to provide a system for characterizing image texture that was not prone to iteration-type errors.

It would also be advantageous to provide a system for characterizing image texture that could be performed in a time-saving, parallel manner, such as by parallel processors.

It would also be advantageous to provide a system for processing one image by a plurality of thresholding rules rather than successively processing intermediate images.

It would also be advantageous to provide a system for characterizing image texture in which the system relies on relative or spatial thresholding of each pixel's intensity with respect to neighboring pixels' intensity, rather than characterizing image texture by means of absolute thresholding.

It would be advantageous to provide a system to generate multiple segmentation maps simultaneously using multiple spatial thresholding values.

It would also be advantageous to provide a system for characterizing image texture on the basis of a mesotexture index, which is a function of at least two spatial threshold operations.

It would also be advantageous to quantify portions of an image based on the texture thereof.

It would also be advantageous to provide a system for generating a graphics curve of image texture based on a plurality of mesotexture indices.

SUMMARY OF THE INVENTION

In accordance with the present invention, there is provided a method of characterizing texture of an image. The image is interrogated at least twice in accordance with at least two respective spatial threshold rules. A value for each of the interrogations is obtained. A mesotexture index is calculated by dividing the product of the values by the difference thereof. A plurality of resulting mesotexture indices can be used to generate a characteristic curve that uniquely identifies the image. Since the process is not iterative, a plurality of interrogating steps can be performed in parallel.

BRIEF DESCRIPTION OF THE DRAWINGS

A complete understanding of the present invention may be obtained by reference to the accompanying drawings and photographs, when taken in conjunction with the detailed description thereof and in which.

DESCRIPTION OF THE PREFERRED EMBODIMENT

While the embodiment herein described relates to apparatus for optically inspecting a photograph, it should be understood that other methods of digitizing photographs or of entering data representative of images are well known in the art and can be used in accordance with the present invention. Therefore, the invention is not intended to be limited to the optical examination apparatus herein disclosed.

Figure 1:
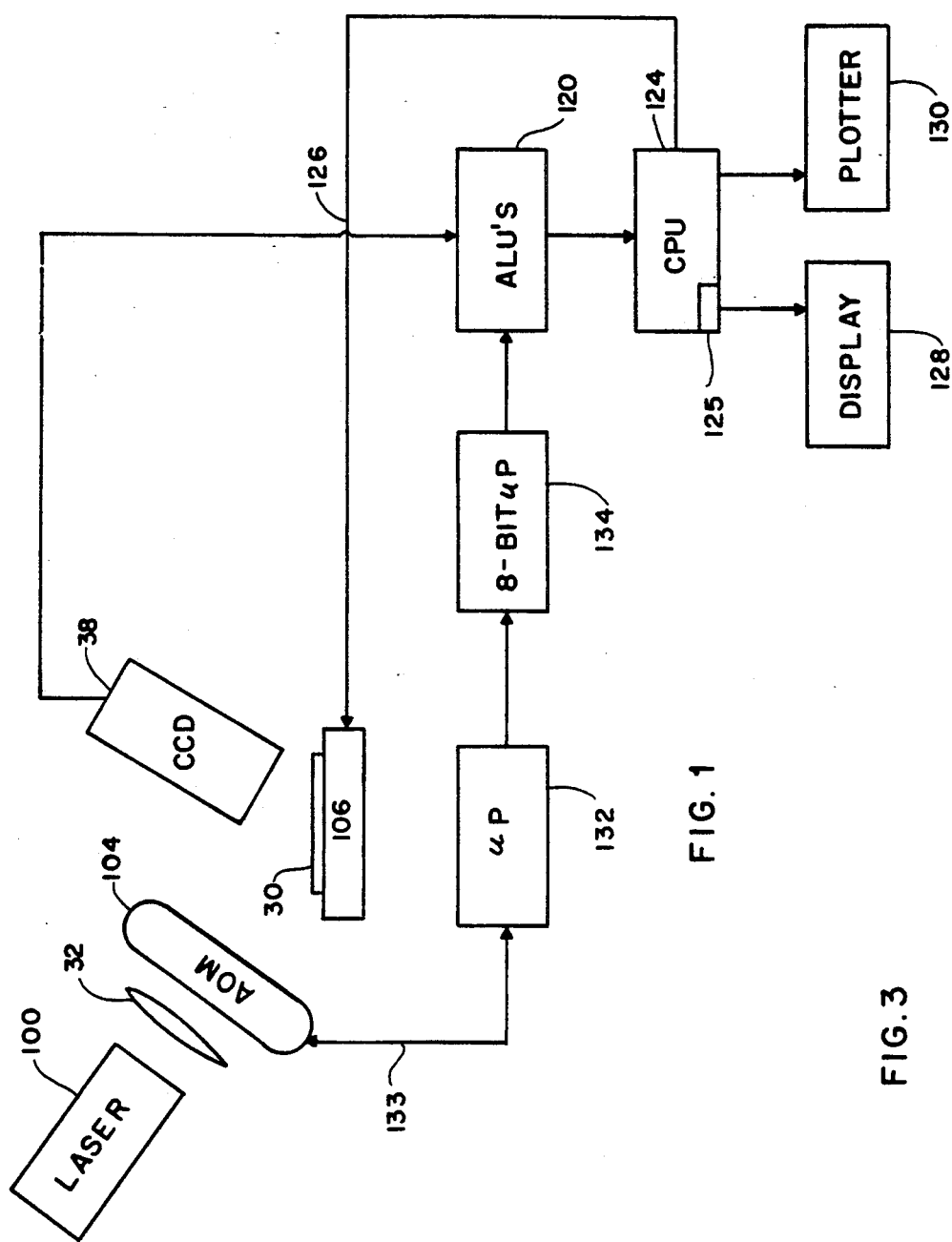
FIG. 1 is a block diagram depicting an image processing system suitable for use with the technique of the present invention.

Referring now to FIG. 1, there is shown a block diagram representation of a system in accordance with the present invention. A light source 100, such as a laser supplied by the Lexel Company as Model No. 65, is used for illumination. A laser is preferred because it emits a bright, concentrated light and it can be chosen to emit a light frequency optimally matched to the photographs inspected, as identified by reference numeral 30.

An optical lens assembly 32 forms a light slit or flying spot, not shown. Mounted in close proximity to optical lens assembly 32 is an acousto optic modulator (AOM) 104, such as model No. AOM-80 manufactured by Intraaction Co., which is an electro-optical device used to deflect the light slit or flying spot. Connected to AOM 104 is a 16-bit microprocessor 132, such as Model No. 68000 manufactured by Motorola Corp., for controlling operation thereof over bidirectional line 133. Microprocessor 132 is connected to one or more 8-bit microprocessors 134, such as are available under the Model No. 6809.

A numerically controlled table 106 is provided to support photograph 30 under examination and to move photograph 30 along both an X-axis and a Y-axis. A CCD imaging device 38 is provided to receive light reflected from photograph 30 and to generate a signal in response to the image, the signal adapted to vary with the intensity of the reflected light.

To increase processing speed, Arithmetic Logic Units (ALU's) 120, such as are supplied by Texas Instruments as Model No. 74S181, can be incorporated in analysis circuitry. ALU's 120 receive signal input both from microprocessor 134 and CCD 38. Each ALU 120 can perform algorithmic and arithmetic operations such as addition, subtraction, comparisons and any other functions required for filtering, transformation or mesotexture indexing functions, as hereinbelow described. ALU's 120 operate in parallel in the preferred embodiment to increase throughput. The output of ALU's 120 is applied to a CPU 124, which calculates ratios or indices in accordance with rules hereinbelow described.

A commercially available graphics display card 128 supplied by Control Systems Co. under the trademark ARTIST I, is connected to the CPU 124. A plotter 130 can be used in lieu of or in conjunction with display card 128.

A signal output from CPU 124 over line 126 also operates numerically controlled table 106 to move photograph 30 along the X-axis, the Y-axis or both, as required.

The segmenter of the present invention is designed to process an entire image or scene in one cycle (one iteration) of segmentation. Multi-level vision of the scene is achieved by using multiple thresholding levels, each constituting a discrete, rather than iterative, segmentation. Hence, the operation is intrinsically parallel. The result is a series of transformed images as if produced from various distances from the object or photograph thereof.

The entire segmentation process is automated through the use of an automation file 125 within CPU 124. To change a segmentation with cutoff of 1 to 2, the cutoff value in automation file 125 is simply changed by using ten cutoff values. For example, ten different automation files, not shown, may be defined. Moreover, ten parallel processors, not shown, can generate these ten segmentations simultaneously.

Figure 2:
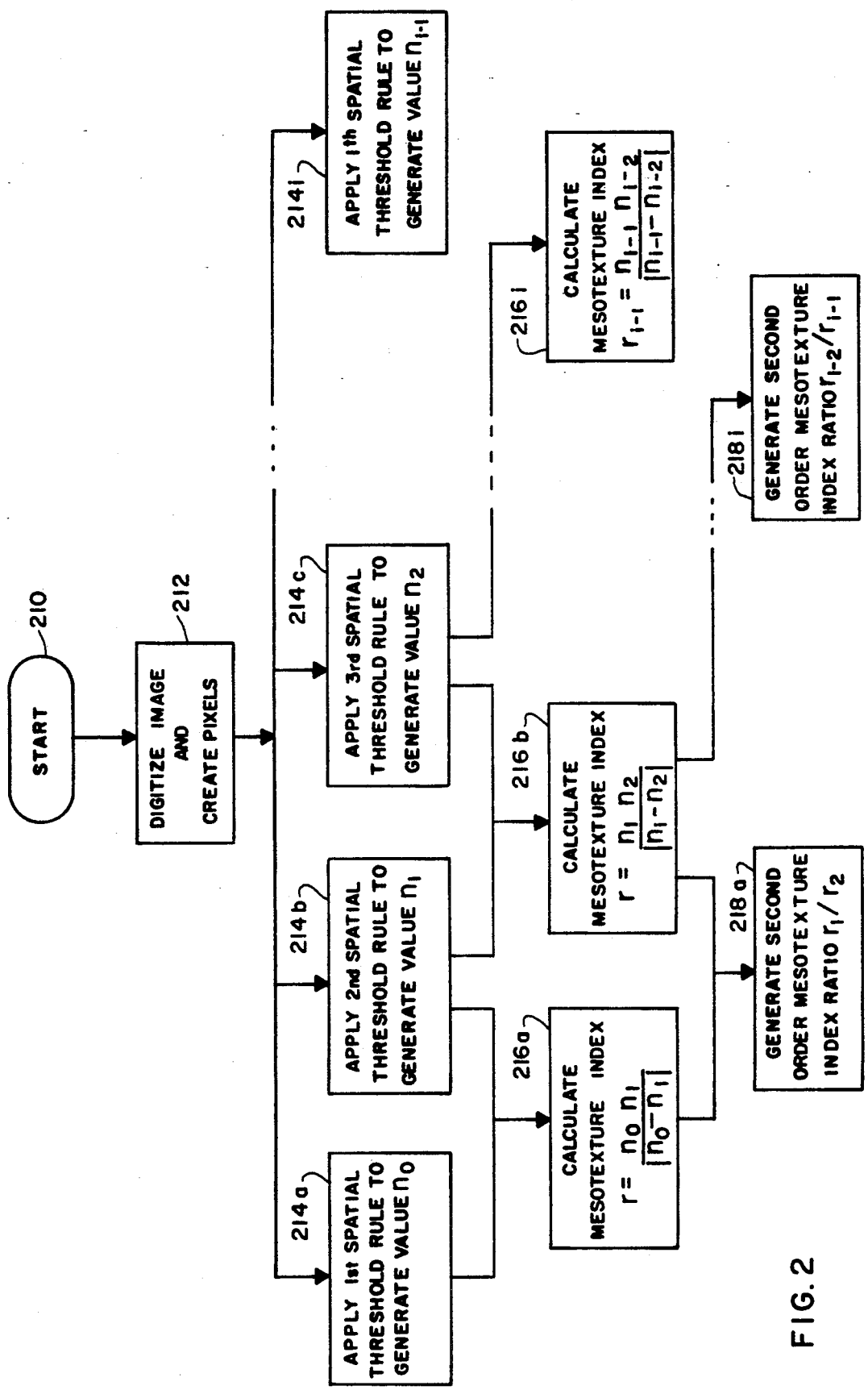
FIG. 2 is a flow chart of operations controlled by the processor shown in FIG. 1.

Referring now also to FIG. 2, there is shown a flow chart of operations controlled by CPU 124 (FIG. 1) or any other suitable processor.

When image processing begins, step 210, the image is digitized and pixels are created, step 212. If the image is already in digital form, step 212 can be omitted.

A series of spatial threshold rules is applied to the digitized image as shown by steps 214a, 214b, 214c, ..., 214i. All spatial threshold rules can be applied to the same digitized image simultaneously (in parallel). Therefore, no movement of the base image is necessary and no comparison to any external reference need be made. In this way, the present invention is self-contained; the same image is interrogated by a number of spatial rules in order to characterize that stationary image.

The aforementioned U.S. Pat. No. 4,617,682 issued to Mori discloses a technique by which texture identification is performed relative to a reference image. Thus, the term "coarseness" is merely relative. If a great difference exists between the pixels in the reference area and those in the examined area (even if the examined area is actually smooth and the reference area is coarse), the texture of the examined area is identified as being "coarse." Conversely, a roughly-textured examined area could be considered smooth when compared to an identical roughly-textured reference area.

An example of a spatial threshold rule applied to a digitized image relates each pixel to each neighboring pixel such that, if the intensity of two neighboring pixels is equal (i.e., they are of equal intensity), then they are to be merged, according to the equation:

$$|x_i - x_j| = 0$$

Another example of a spatial threshold rule applied to the same, original image is represented by the equation:

$$|x_i - x_j| \leq 1$$

That is, if two neighboring pixels are within one intensity level difference, they are to be merged.

A third example of a spatial threshold rule applied to the same, original digitized image is represented by the equation:

$$|x_i - x_j| \leq 2$$

In this way, a plurality of spatial threshold rules a-i can be applied to the same, original digitized image. The resulting value generated by each of the aforementioned spatial threshold rules is identified: $n_0, n_1, n_2, \ldots, n_{i-1}$.

It should be understood that any algorithm may be used to perform such neighboring pixel merging operations without departing from the scope of the present invention, although only a simple logic representation of the concept is provided herein.

Once spatial threshold rule generated values n are obtained, steps 214a-214i, consecutive values are arithmetically manipulated to derive mesotexture indices, steps 216a, 216b, ..., 216i. Specifically, a mesotexture index $r_i$ is calculated in accordance with the following equation.

$$r_i = \frac{n_0 n_1}{|n_0 - n_1|}$$

Figure 3:
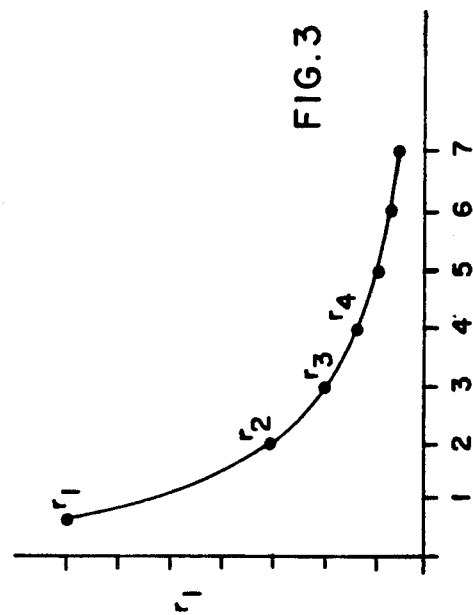
FIG. 3 is a cartesian coordinate texture characterization curve.

Once mesotexture indices have been calculated, they can be plotted on a standard cartesian curve, which represents the mesotexture characteristic curve for the image under analysis. That is, the mesotexture index r can be plotted against the two spatial threshold rules from which it was calculated. A representative curve of such a calculation is shown in FIG. 3.

In order to generate a second order mesotexture index, a ratio of mexotexture indices is obtained, steps 218a-218i. The second order mesotexture index r' is calculated as follows.

$$r'_1 = r_1 / r_2$$

Once again, a second order mesotexture characteristics curve, not shown, can be generated on cartesian coordinates with the second order ratio plotted against threshold values or mesotexture index values.

Figure 4A:
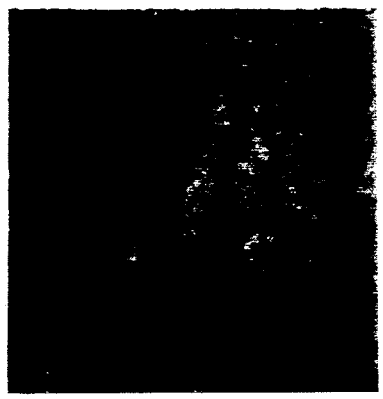
FIGS. 4a–4g are photographs depicting various exemplary terrains for purposes of illustration.

Referring now to FIGS. 4a-4g, there are shown seven different gray scale aerial images of terrain photographed by side looking radar (SLAR). FIG. 4a depicts a substantially uniform cultivated field. When digitized, this image is divided into 128 columns by 128 rows (16,384 pixels). After grouping by using algorithm $|x_i - x_j| = 0$, the number of groups in the segmented image is 10545, as shown in Table I.

TABLE I

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 10545 | | | |
| 1 | 4012 | 6533 | 64.7 | |
| 2 | 1295 | 2717 | 19.1 | 3.3865 |
| 3 | 423 | 872 | 6.2 | 3.0440 |
| 4 | 152 | 271 | 2.3 | 2.6478 |
| 5 | 83 | 69 | 1.8 | 1.2976 |
| 6 | 39 | 44 | .7 | 2.4853 |
| 7 | 16 | 23 | .2 | 2.7116 |
| 8 | 16 | 0 | ∞ | 0.0000 |
| 9 | 11 | 5 | .3 | ∞ |
| 10 | 7 | 4 | .1 | .8286 |

When the digitized image is interrogated again, in accordance with the algorithm $|x_i - x_j| \leq 1$, the number of groups in the segmented image is 4012 (Table I). Mesotexture $r_i$ is calculated in accordance with the equation:

$$r_i = \frac{n_0 n_1}{|n_0 - n_1|}$$

In this manner, successive iterations result in the data shown in Table I. Note that a second order mesotexture index $r'_i$ is calculated by taking the ratio of successive mesotexture indices $r_1/r_2$.

Figure 4B:
Figure 4C:
Figure 4D:
Figure 4E:
Figure 4F:
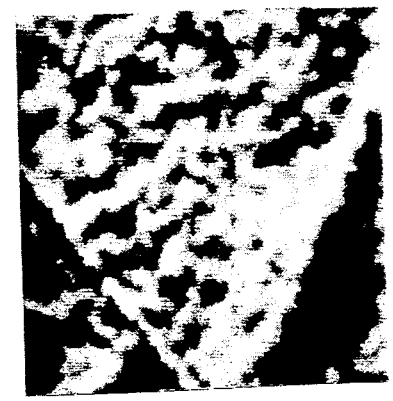
Figure 4G:

Similarly, FIGS. 4b–4g represent, respectively, gray scale aerial SLAR images, as follows:

FIG. 4b—Shrubbery
FIG. 4c—Grassy field with trees
FIG. 4d—Coarse vegetation
FIG. 4e—River with trees
FIG. 4f—Coarse vegetation
FIG. 4g—Grassy cultivated field with high moisture content Tables II-VII represent the data derived from each of the respective digitized images, FIGS. 4b–4g.

TABLE II

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 13849 | | | |
| 1 | 9968 | 3881 | 355.6 | |
| 2 | 6694 | 3274 | 203.8 | 1.7453 |
| 3 | 4578 | 2116 | 144.8 | 1.4072 |
| 4 | 3062 | 1516 | 92.4 | 1.5663 |
| 5 | 2117 | 945 | 68.5 | 1.3480 |
| 6 | 1370 | 747 | 38.8 | 1.7667 |
| 7 | 915 | 455 | 27.5 | 1.4093 |
| 8 | 645 | 270 | 21.8 | 1.2604 |
| 9 | 444 | 201 | 14.2 | 1.5342 |
| 10 | 299 | 145 | 9.1 | 1.5562 |
| 11 | 210 | 89 | 7.0 | 1.2977 |
| 12 | 149 | 61 | 5.1 | 1.3754 |

TABLE III

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 11189 | | | |
| 1 | 5889 | 5300 | 124.3 | |
| 2 | 3133 | 2756 | 66.9 | 1.8571 |
| 3 | 1953 | 1180 | 51.8 | 1.2910 |
| 4 | 1197 | 756 | 30.9 | 1.6769 |
| 5 | 752 | 445 | 20.2 | 1.5287 |
| 6 | 491 | 261 | 14.1 | 1.4299 |
| 7 | 357 | 134 | 13.0 | 1.0815 |
| 8 | 258 | 99 | 9.3 | 1.4060 |
| 9 | 188 | 70 | 6.9 | 1.3427 |
| 10 | 135 | 53 | 4.7 | 1.4470 |

TABLE IV

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 13091 | | | |
| 1 | 8439 | 4652 | 237.4 | |
| 2 | 5091 | 3348 | 128.3 | 1.8506 |
| 3 | 3200 | 1891 | 86.1 | 1.4895 |
| 4 | 1927 | 1273 | 48.4 | 1.7785 |
| 5 | 1164 | 763 | 29.3 | 1.6478 |
| 6 | 746 | 418 | 20.7 | 1.4151 |
| 7 | 482 | 264 | 13.6 | 1.5252 |
| 8 | 359 | 123 | 14.0 | 0.9682 |
| 9 | 255 | 104 | 8.8 | 1.5982 |
| 10 | 173 | 82 | 5.3 | 1.6362 |

TABLE V

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 11642 | | | |
| 1 | 7742 | 3900 | 231.1 | |
| 2 | 5108 | 2634 | 150.1 | 1.5393 |
| 3 | 3558 | 1550 | 117.2 | 1.2805 |
| 4 | 2509 | 1049 | 85.1 | 1.3778 |
| 5 | 1862 | 647 | 72.2 | 1.1786 |
| 6 | 1381 | 481 | 53.4 | 1.3507 |
| 7 | 1054 | 327 | 44.5 | 1.2010 |
| 8 | 820 | 234 | 36.9 | 1.2052 |
| 9 | 638 | 182 | 28.7 | 1.2849 |
| 10 | 478 | 160 | 19.0 | 1.5081 |

TABLE VI

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 14352 | | | |
| 1 | 11397 | 2955 | 553.5 | |
| 2 | 8590 | 2807 | 348.7 | 1.5871 |
| 3 | 6714 | 1876 | 307.4 | 1.1345 |
| 4 | 5120 | 1594 | 215.6 | 1.4255 |
| 5 | 3897 | 1223 | 163.1 | 1.3219 |
| 6 | 2894 | 1003 | 112.4 | 1.4509 |
| 7 | 2195 | 699 | 90.8 | 1.2373 |
| 8 | 1633 | 562 | 63.7 | 1.4249 |
| 9 | 1212 | 421 | 47.0 | 1.3567 |
| 10 | 898 | 314 | 34.6 | 1.3563 |

TABLE VII

| Cut (i) | Groups ($n_i$) | Difference ($n_{i+1} - n_i$) | Mesotexture ($r_i$) | Second Order Mesotexture ($r'_i$) |
|---|---|---|---|---|
| 0 | 10649 | | | |
| 1 | 4953 | 5696 | 92.5 | |
| 2 | 2504 | 2449 | 50.6 | 1.8285 |
| 3 | 1618 | 886 | 45.7 | 1.1075 |
| 4 | 1079 | 539 | 32.3 | 1.4118 |
| 5 | 769 | 310 | 26.7 | 1.2101 |
| 6 | 526 | 243 | 16.6 | 1.6080 |
| 7 | 437 | 89 | 25.8 | 0.6445 |
| 8 | 325 | 112 | 12.6 | 2.0367 |
| 9 | 251 | 74 | 11.0 | 1.1503 |
| 10 | 190 | 61 | 7.8 | 1.4100 |

It can be seen from the successive mesotexture indices that characteristics of images can be predicted. For example, only three iterations are required to reach a mesotexture index of less than 20 (Table I) for an image of a relatively homogeneous cultivated field (FIG. 4a), whereas more than ten iterations are required to reach a mesotexture index of 20 (Table VI) for an image of heterogeneous vegetative cover (FIG. 4f).

If these two above mentioned images are considered extreme examples (fine texture vs. coarse texture), one would expect that an image having uniform terrain cover such as a grassy cultivated field (FIGS. 4c and 4g) would result in mexotexture indices in which a value of 20 would require more than two but less than ten iterations, as is the case (Tables III and VII).

EXAMPLE I

In order to show the superiority of the present invention over other present day processes, and in particular over iterative processes, such as that illustrated in the aforementioned U.S. Pat. No. 4,617,682, issued to Mori et al, the above image created by step 212 (FIG. 2) was attempted, using the Mori et al iterative process. The results are shown in Table VIII, below.

TABLE VIII

|  | Mori Reference | Present Invention |
|---|---|---|
| Self-contained analysis of image | No | Yes |
| Characterize given image | No | Yes |
| Calculate mesotexture of image | No | Yes |
| Extract features for comparison | No | Yes |
| Identify texture "coarseness" by correlating two patterns | Yes | No |
| Compare and measure reference area to observed image | Yes | No |
| Number of comparisons for 512 × 512 image areas | At least 512 × 512 = 262,144 | Less than 10 features |
| Select portion of image as base; move reference area relative to base | Yes; at least 262,144 times | No; no movement |
| No. of rules applied/no. of image areas | 1 rule/ 262,166 areas | At least 2 rules/single image area |

As a practical matter, the above data could not be parallel processed because of the iterative nature of the prior art method. The time to process the above result would have been greatly in excess of the time necessary to achieve the results by means of the present invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A self-contained method of characterizing texture of an image utilizing adjacent area values processed in parallel, and identifying regions of said image from the characterized texture, the steps comprising:
   a) sensing a scene in order to produce an image;
   b) interrogating said image in accordance with a first rule having a spatial threshold value $v_0$ to generate a first number $n_0$ which is a function of spatially discrete regions;
   c) interrogating said image in accordance with a second rule having a spatial threshold value $v_1$ to generate a second number $n_1$;
   d) interrogating said image in accordance with a third rule having a spatial threshold value $v_2$ to generate a third number $n_2$;
   e) interrogating said image in accordance with a fourth rule having a spatial threshold value $v_3$ to generate a fourth number $n_3$;
   f) continuing to interrogate said image with rules until an $i^{th}$ rule is applied having a spatial threshold value $v_{i-1}$ in order to generate a number $n_{i-1}$;
   g) calculating mesotexture indices $r_0, r_1, r_2, \ldots$ up to $r_i$ of said image equal to a product of adjacent numbers from $n_0; n_1, n_2, n_2; n_3, \ldots$ up to $n_i; n_{i-1}$, and each divided by a difference of said adjacent numbers from $n_0-n_1, n_1-n_2, n_2-n_3 \ldots$ up to $n_i-n_1$, respectively;
   h) generating second order mesotexture indices of said image from ratios of adjacent mesotexture indices $r_1;r_2, r_2;r_3, \ldots$ up to $r_{i-2};r_{i-1}$, all of said calculations and generations steps (a) through (g) being performed in parallel; and
   i) utilizing said first and/or second order mesotexture indices to identify regions of said image and producing a calibrated output indicative thereof.

2. The method of characterizing texture of regions of an image and identifying said regions from said texture, in accordance with claim 1, the steps further comprising:
   j) testing an observed region against mesotexture indices of said calibrated output to characterize the texture of said region.

3. A parallel processing method for distinguishing two portions of an image from one another, the steps comprising:
   a) sensing a scene in order to produce an image, said image having a number of image portions;
   b) calculating a first set of indices $r_0$ through $r_i$, representative of mesotexture of a first image portion;
   c) calculating a second set of indices $g_0$ through $g_i$, representative of mesotexture of an additional image portion;
   d) directly comparing $r_0$ to $g_0$, $r_1$ to $g_1$, $r_3$ to $g_3$, etc., with one another; and
   e) identifying respective image portions, said image portions being identified by distinguishing respective mesotexture indices from one another, said distinguishing of said respective mesotexture indices $r_0$ through $r_i$ and $g_0$ through $g_i$ further comprising the steps of:
   i) interrogating said first image portion in accordance with a first rule, having a spatial threshold value $V_0$, to generate a first number $n_0$, which is a function of a spatially discrete region;
   ii) interrogating said first image portion in accordance with a second rule, having a spatial threshold value $v_1$, to generate a second number $n_1$;
   iii) interrogating said first image in accordance with third, fourth, etc., rules, having spatial threshold values $v_2$, $v_3$, etc., to generate additional numbers $n_2$, $n_3$, etc.;
   iv) calculating said mesotexture index $r_0$ as a function of said first and second numbers $n_0$ and $n_1$, $r_1$ as a function of said second and third numbers $n_1$, $n_2$, $r_2$ as a function of said third and fourth numbers $n_2$, $n_3$, etc.;
   v) interrogating said second image in accordance with a first rule, having a spatial threshold value $w_0$, to generate a first number $m_0$, which is a function of spatially discrete regions;
   vi) interrogating said second image in accordance with a second rule, having a spatial threshold value $w_1$, to generate a second number $m_1$; and
   vii) calculating said mesotexture index $g_0$ as a function of said first and second numbers $m_0$ and $m_1$, $q_1$ as a function of said second and third numbers $m_1$, $m_2$, $q_2$ as a function of said third and fourth numbers $m_2$, $m_3$, etc.

4. The method in accordance with claim 3, the steps further comprising repeating steps (b) through (c) for a plurality of spatial threshold values $v_2$, $V_3$, $V_4$, $\ldots v_i$ and $w_2$, $w_3$, $w_4$, $\ldots$, $w_i$ thereby generating a plurality of mesotexture indices $r_1, r_2, r_3, \ldots, r_{i-1}$ and $q_1, q_2, q_3, \ldots, q_{i-1}$.

5. The method in accordance with claim 4, the steps further comprising:
   a) generating second order mesotexture indices $r'_0$ and $q'_0$ by calculating the ratios of successive mesotexture indices $r_0$, $r_1$ and $q_0$, $q_1$.

6. The method in accordance with claim 5, the steps further comprising repeating step (a) for a plurality of mesotexture indices $r'_1, r'_2, r'_3, \ldots, r'_{i-1}$ and $q'_1, q'_2, q'_3, \ldots, q'_{i-2}$.

7. The method in accordance with claim 3, wherein said interrogating steps (i)–(II) are performed substantially in parallel.

8. The method in accordance with claim 3, wherein said interrogating steps (iv)–(v) are performed substantially in parallel.

9. The method in accordance with claim 3, wherein said calculating step (iii) comprises dividing the product of said first and second numbers, $n_0$ and $n_1$, by the difference thereof.

10. The method in accordance with claim 3, wherein said calculating step (vi) comprises dividing the product of said first and second numbers, $m_0$ and $m_1$, by the difference thereof.

11. A method of characterizing texture of an image utilizing adjacent area values processed in parallel, and identifying respective regions of said image by distinguishing the characterized texture, the steps comprising:
 a) sensing a scene to produce an image;
 b) interrogating said image in accordance with a first rule having a spatial threshold value $v_0$ to generate a first number $n_0$ which is a function of spatially discrete regions;
 c) interrogating said image in accordance with a second rule having a spatial threshold value $v_1$ to generate a second number $n_1$;
 d) interrogating said image in accordance with a third rule having a spatial threshold value $v_2$ to generate a third number $n_2$;
 e) interrogating said image in accordance with a fourth rule having a spatial threshold value $v_3$ to generate a fourth number $n_3$;
 f) continuing to interrogate said image with rules until an $i^{th}$ rule is applied having a spatial threshold value $v_{i-1}$ in order to generate a number $n_{i-1}$;
 g) calculating mesotexture indices $r_0, r_1, r_2, \ldots$ up to $r_i$, equal to a product of adjacent numbers from $n_0$; $n_1, n_1;n_2, n_2; n_3, \ldots$ up to $n_i; n_{i-1}$, and each divided by a difference of said adjacent numbers from $n_0-n_1, n_1-n_2, n_2-n_3, \ldots$ up to $n_i-n_{i-1}$, respectively;
 h) generating second order mesotexture indices from ratios of adjacent mesotexture indices $r_1; r_2, r_2;r_3, \ldots$ up to $r_{i-2}; r_{i-1}$, all of said calculations and generations in steps b) through h) being performed in parallel; and
 i) identifying respective regions of said image according to differences in first and/or second order mesotexture indices.

12. The method of characterizing texture in accordance with claim 11, the steps further comprising:
 j) testing an observed region against mesotexture indices to classify and characterize the texture of said image.

13. A parallel processing apparatus for distinguishing two portions of an image from one another, utilizing adjacent area values, comprising:
 a) means for producing an image having distinguishable portions;
 b) means for calculating a first set of indices $r_0$ through $r_i$, representative of mesotexture of a first image portion;
 c) means for calculating a second set of indices $g_0$ through $g_i$, representative of mesotexture of an additional image portion; and
 means for directly comparing $r_0$ to $g_0$, $r_1$ to $g_1$, $r_2$ to $g_2$, etc., with one another, whereby said respective image portions are distinguishable from one another when said respective mesotexture indices $r_0$ and $g_0$, $r_1$ and $g_1$, $r_2$ and $g_2$, etc., differ from one another.

14. The parallel processing apparatus for distinguishing portions of an image in accordance with claim 13, wherein said means for comparing comprises means for:
 i) interrogating an image in accordance with a first rule having a spatial threshold value $v_0$ to generate a first number $n_0$ which is a function of spatially discrete regions;
 ii) interrogating said image in accordance with a second rule having a spatial threshold value $v_1$ to generate a second number $n_1$;
 iii) interrogating said image in accordance with third, fourth, etc., rules having spatial threshold values $v_2, v_3$, etc., to generate additional numbers $n_2, n_3$, etc.; and
 iv) calculating said mesotexture indices $r_0$ as a function of said first and second numbers $n_0$ and $n_1$, $r_1$ as a function of said second and third numbers $n_1, n_2, r_2$ as a function of said third and fourth numbers $n_2, n_3$, etc.

15. A self-contained method of characterizing texture if a one-dimensional image utilizing adjacent area values processed in parallel, and identifying regions of said image from the characterized texture, the steps comprising:
 a) sensing a scene in order to produce a one-dimensional image;
 b) interrogating said image in accordance with a first rule having a spatial threshold value $v_0$ to generate number $n_0$ representative of a first, transformed, one-dimensional image which is a function of spatially discrete regions;
 c) interrogating said image in accordance with a second rule having a spatial threshold value $v_1$ to generate a number $n_1$ representative of a second, transformed, one-dimensional image;
 d) interrogating said image in accordance with a third rule having a spatial threshold value $v_2$ to generate a number $n_2$ representative of a third, transformed, one-dimensional image;
 e) interrogating said image in accordance with a fourth rule having a spatial threshold value $v_3$ to generate a number $n_3$ representative of a fourth, transformed, one-dimensional image;
 f) continuing to interrogate said image with rules until an $i^{th}$ rule is applied having a spatial threshold value $v_{i-1}$ in order to generate a number $n_{i-1}$ representative of an $i^{th}$ transformed, one-dimensional image;
 g) calculating first and second order mesotexture indices;
 h) utilizing said first and/or second order mesotexture indices to identify regions of said one-dimensional image and producing a calibrated output indicative thereof.

16. The method of characterizing texture of regions of a one-dimensional image and identifying said regions from said texture, in accordance with claim 15, the steps further comprising:

i) testing an observed region against mesotexture indices of said calibrated output to characterize the texture of said one-dimensional image.

17. A parallel processing apparatus for distinguishing at least two images from one another, utilizing adjacent area values, comprising:
   a) means for producing a two-dimensional image having distinguishable portions;
   b) means for calculating a first set of indices $r_0$ through $r_i$, representative of mesotexture of a first image portion;
   c) means for calculating a second set of indices $g_0$ through $g_i$, representative of mesotexture of an additional image portion or an additional, original, observed image; and
   d) means for directly comparing $r_0$ to $g_0$, $r_1$ to $g_1$, $r_2$ to $g_2$, etc., with one another, whereby said respective image portions or said observed images are distinguishable from one another when said respective mesotexture indices $r_0$ and $g_0$, $r_1$ and $g_1$, $r_2$ and $g_3$, etc., differ from one another.

18. A parallel processing apparatus for distinguishing at least two images from one another, utilizing adjacent area values, comprising:
   a) means for producing an original, one-dimensional image having distinguishable potions;
   b) means for generating a number $n_0$ representative of a first transformation mesotexture of said one-dimensional image;
   c) means for generating numbers $n_1$, $n_2$, $n_3$, etc., representative of second, third, forth, etc., transformation mesotextures of said one-dimensional image;
   d) means for deriving a characteristic of said one-dimensional image based on said numbers $n_0 - n_{i-1}$; and
   e) means for testing at least a portion of a newly observed image against said derived characteristic.

* * * * *